(12) United States Patent
Brück et al.

(10) Patent No.: US 7,252,809 B2
(45) Date of Patent: Aug. 7, 2007

(54) RADIAL-FLOW AND SEGMENTED HONEYCOMB BODY

(75) Inventors: Rolf Brück, Bergisch Gladbach (DE); Jörg Zimmermann, Bad Münstereifel (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 797 days.

(21) Appl. No.: 10/438,372

(22) Filed: May 14, 2003

(65) Prior Publication Data

US 2003/0202919 A1 Oct. 30, 2003

Related U.S. Application Data

(63) Continuation of application No. PCT/EP01/12313, filed on Oct. 25, 2001.

(30) Foreign Application Priority Data

Nov. 14, 2000 (DE) ................................. 100 56 279

(51) Int. Cl.
*F01N 3/00* (2006.01)
*F01N 3/28* (2006.01)

(52) U.S. Cl. ...................... 422/181; 422/180; 422/218; 422/222

(58) Field of Classification Search ................ 422/181, 422/218

See application file for complete search history.

(56) References Cited

U.S. PATENT DOCUMENTS 3,819,334 A * 6/1974 Yoshida et al. ............. 422/173
5,118,475 A * 6/1992 Cornelison .................. 422/174
5,303,547 A * 4/1994 Mieville et al. ............... 60/274
5,531,968 A * 7/1996 Steenackers ................. 422/176
5,562,885 A   10/1996 Bayer et al.
5,645,803 A    7/1997 Steenackers et al.
5,809,776 A * 9/1998 Holtermann et al. .......... 60/288
5,902,558 A    5/1999 Maus et al.
6,293,009 B1   9/2001 Kruse

FOREIGN PATENT DOCUMENTS

| DE | 93 15 010.5 U1 | 5/1994 |
| DE | 197 40 966 A1 | 3/1999 |
| DE | 199 22 358 C1 | 1/2001 |
| EP | 0 676 534 A1 | 10/1995 |
| FR | 2 617 903 A1 | 1/1989 |
| WO | 93/20339 | 10/1993 |
| WO | 96/09893 | 4/1996 |
| WO | 99/36681 | 7/1999 |
| WO | 99/37897 | 7/1999 |

\* cited by examiner

*Primary Examiner*—Glenn Caldarola
*Assistant Examiner*—Jennifer A. Leung
(74) *Attorney, Agent, or Firm*—Laurence A. Greenberg; Werner H. Stemer; Ralph E. Locher

(57) ABSTRACT

A honeycomb body for the chemical conversion of at least one component of a gas stream, in particular an exhaust-gas stream from an internal combustion engine, includes an inflow passage having an axis, and sheet-metal layers. At least some of the sheet-metal layers are structured to form two sets of crests and passages through which the gas stream can flow. Each of the sets of crests of each of the sheet-metal layers define a respective plane. The sheet-metal layers are segmented in circumferential direction of the honeycomb body. The axis and the plane include an angle of between 45° and 135°, preferably between 70° and 110°. The radial honeycomb body is particularly easy to produce.

22 Claims, 2 Drawing Sheets

RADIAL-FLOW AND SEGMENTED HONEYCOMB BODY

CROSS-REFERENCE TO RELATED APPLICATION

This application is a continuation of International Application No. PCT/EP01/12313, filed Oct. 25, 2001, which designated the United States and was not published in English.

BACKGROUND OF THE INVENTION

Field of the Invention

The invention relates to a honeycomb body for the chemical conversion of at least one component of a gas stream, including an inflow passage having an axis, and sheet-metal layers. At least some of the sheet-metal layers are structured to form two sets of crests and passages through which the gas stream can flow. Each of the sets of crests of each of the sheet-metal layers define a respective plane. The axis and the plane include an angle of between 45° and 135°, preferably between 70° and 110°. Honeycomb bodies of that type are used in particular to purify an exhaust-gas stream from an internal combustion engine or to reform a hydrocarbon-containing gas stream for the generation of hydrogen.

Such a honeycomb body is known, for example, from European Patent Application 0 783 370, published as International Publication No. WO 96/09893, corresponding to U.S. Pat. No. 5,902,558. Those documents describe a honeycomb body for catalytic conversion of exhaust gases in an exhaust system of an internal combustion engine, which includes a large number of passages, each passage opening out at one end into a central passage. The passages curve outwardly from the central passage and are delimited by abutting plates. At least some of the plates have a macrostructure which forms a lateral boundary of the passages. The honeycomb body constructed in plate form imposes very high demands during production of the macrostructure, in particular during the shaping of the macrostructure close to the central passage, since that is where the shortest distances within the macrostructure have to be generated.

SUMMARY OF THE INVENTION

It is accordingly an object of the invention to provide a radial-flow and segmented honeycomb body, which overcomes the hereinafore-mentioned disadvantages of the heretofore-known devices of this general type and which can be produced more easily and at lower cost.

With the foregoing and other objects in view there is provided, in accordance with the invention, a honeycomb body for the chemical conversion of at least one component of a gas stream, in particular an exhaust-gas stream from an internal combustion engine, comprising an inflow passage having an axis, and sheet-metal layers. At least some of the sheet-metal layers are structured to form two sets of crests and passages through which the gas stream can flow. Each of the sets of crests of each of the sheet-metal layers define a respective plane. The sheet-metal layers are segmented in circumferential direction of the honeycomb body. The axis and the plane include an angle of between 45° and 135°, preferably between 70° and 110°.

The structure according to the invention has the advantage of eliminating the need to stamp sheet-metal layers in plate form. Rather, the sheet-metal layers can be produced from metal sheets which, by way of example, can be fed continuously to a device, with a structure being produced in the sheet-metal layers with the aid of a rolling process. These structured metal sheets are then divided into segments, which are then layered in such a manner that a honeycomb body according to the invention is formed. Moreover, due to its layered structure, the honeycomb body according to the invention ensures a particularly flexible construction with regard to the passage shape. As a result, the shape of the passages may differ, for example in the axial direction of the honeycomb body.

The at least one component of the gas stream is in particular pollutants which are contained in the exhaust gas. The pollutants may, for example, be unsaturated hydrocarbons, carbon monoxide, nitrogen oxides or sulfur oxides.

In accordance with another feature of the invention, the passages run substantially radially. In this context, it is particularly advantageous if the flow cross section of the passages increases radially outwardly from the inflow passage. The radially outwardly running passages ensure a very low pressure loss. The fact that the flow cross sections open up cause the gas stream to be swirled, with the result that any deposits (soot, particulates, etc.) on the passage or channel wall, which can otherwise lead to an increased pressure loss, are removed.

In accordance with a further feature of the invention, the segments are delimited by two sides or flanks and by first and second arc sections. The sides or flanks run substantially radially and the first arc section is smaller than the second arc section. This configuration of the segments, such that they resemble slices of cake, makes it particularly easy to layer the segments in a sheet-metal layer or plane. Passages, in particular separate passages, are provided over the overall circumference of the honeycomb body.

In accordance with an added feature of the invention, the sheet-metal layers are constructed with corrugated metal sheets, between which there are preferably smooth metal sheets. A plurality of layers of alternating smooth and corrugated metal sheets is formed in the axial direction. The smooth metal sheets in this case are in particular constructed to be segmented in a similar way to the structured metal sheets. When smooth and corrugated metal sheets are alternately layered, the passages are formed in each case by the adjacent smooth and corrugated metal sheets. A configuration of this type allows a particularly flexible configuration and precise orientation of passages.

In accordance with an additional feature of the invention, the metal sheets are constructed with a thickness of less than 0.08 mm, preferably less than 0.04 mm, in particular less than 0.02 mm. In this way, the honeycomb body according to the invention has a very low weight, and the cold-starting performance of a honeycomb body of this type is also improved. Due to the very low thickness, the honeycomb body has a very low area-specific heat capacity, with only a very small quantity of heat being removed by the honeycomb body, in particular from the hot exhaust-gas stream from an internal combustion engine immediately after starting. Therefore, the honeycomb body is heated up more quickly after the internal combustion engine has been started.

In accordance with yet another feature of the invention, the sheet-metal layers have a catalytically active coating for chemical conversion of at least one component, in particular of an exhaust-gas stream from an internal combustion engine. The catalytically active coating allows chemical conversion even at relatively low temperatures. Known catalytically active coatings ensure conversion even at temperatures of from 200° to 250° C. The time required to reach this activation temperature is significantly shortened in combination with a low area-specific heat capacity of the honeycomb body. As a result, the emission of harmful exhaust-gas components to the environment is greatly reduced.

In accordance with yet a further feature of the invention, the sheet-metal layers have projections, which extend into the passages, and/or openings. The projections are responsible for additional swirling of the gas stream in the passages, so that more intensive contact between the exhaust-gas stream and the passage wall, which preferably has a catalytically active coating, is ensured. The openings allow exchange of partial gas streams, with the result that communicating passages are formed. The projections and/or openings significantly improve the efficiency of a honeycomb body of this type with regard to the chemical conversion of at least one component of the exhaust-gas stream.

In accordance with yet an added feature of the invention, the inflow passage is formed at least in part with a perforated and/or porous inner tube. In this case, it is particularly advantageous for the sheet-metal layers, on the radially outer side, to be at least partially surrounded by a perforated and/or porous tubular casing. The perforated and/or porous parts of the inner tube or tubular casing are in this case preferably disposed adjacent the sheet-metal layers. In this way, the gas stream passes, for example, from the inflow passage, through the perforations or pores, into the passages of the sheet-metal layers, flows radially outward through these passages and then emerges again through the perforations and/or pores in the tubular casing. In the event of a reversed incoming flow of the gas stream over the tubular casing, an opposite direction of flow is also ensured. The inner tube and/or the tubular casing in this case preferably have a relatively thin-walled construction, in particular with a wall thickness of less than 0.08 mm, preferably even less than 0.04 mm.

In accordance with yet an additional feature of the invention, there is provided a heating device which extends at least partially through the sheet-metal layers. The heating device is used to improve the light-off performance and therefore ensure that chemical conversion of pollutants contained in the gas stream takes place very quickly after the internal combustion engine has been started. Placing the heating device at least partially in the interior of the sheet-metal layers ensures a sufficient heat flux from the heating device to the sheet-metal layers and/or the gas stream.

In accordance with again another feature of the invention, in this context, there is provided a system of tubes which extends at least partially in the axial direction and through which a heating medium can flow. A system of tubes of this nature functions as a heat exchanger, preferably extending over the entire axial length of the honeycomb body and being distributed over the circumference of the honeycomb body. This ensures particularly uniform heating of the honeycomb body. The heating medium being used is preferably hot water, hot steam or hot air.

In accordance with a concomitant feature of the invention, there is provided an electric heater. The electric heater may, for example, be constructed with a heater wire which passes through the sheet-metal layers. It is also possible, by way of example, to generate a current path through the honeycomb body, with electric heating being formed by the application of a voltage to the honeycomb body in conjunction with the resistance of the metal sheets. Electric heating of this type ensures that high temperatures are reached very quickly after a cold start.

Other features which are considered as characteristic for the invention are set forth in the appended claims.

Although the invention is illustrated and described herein as embodied in a radial-flow and segmented honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
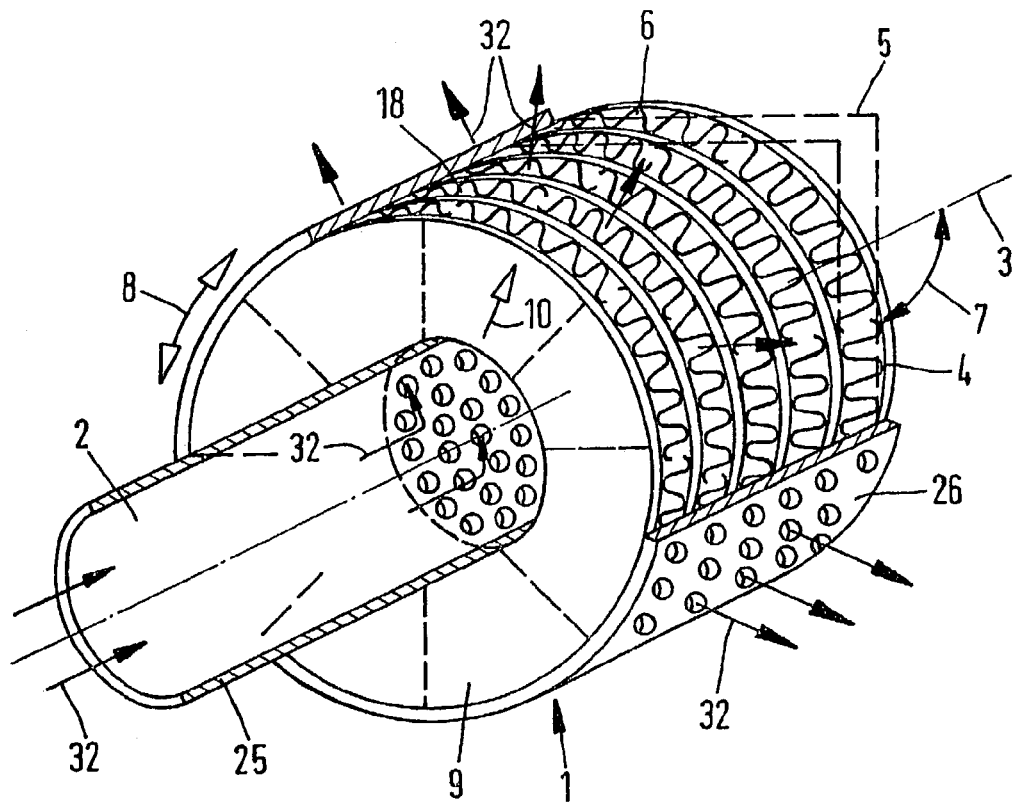
FIG. 1 is a fragmentary, diagrammatic, perspective view of an embodiment of a honeycomb body according to the invention.

Referring now to the figures of the drawings in detail and first, particularly, to FIG. 1 thereof, there is seen a perspective illustration of a honeycomb body 1 for chemical conversion of at least one component of a gas stream. The honeycomb body 1 includes an inflow passage 2 with an axis 3 and sheet-metal layers 4. At least some of the sheet-metal layers 4 are structured in such a way that they form passages 6 through which the gas stream can flow. The structuring forms two sets of crests in each of the sheet-metal layers 4. One set of crests is directed toward the inflow passage 2 and the other set is directed in the opposite direction. Each set of crests defines a respective plane 5. The axis 3 and the plane 5 include an angle 7 which is between 45° and 135°. The sheet-metal layers 4 are segmented in circumferential direction 8, indicated by outlined arrows, to form segments 9.

The honeycomb body 1 is constructed with smooth metal sheets 17 and corrugated metal sheets 16 (shown in FIG. 2), which delimit the passages 6 running in radial direction 10. The honeycomb body 1 is constructed in such a way that a plurality of layers 18 including alternating smooth metal sheets 17 and corrugated metal sheets 16 are formed in the axial direction 3. The sheet-metal layers 4 of the honeycomb body 1 are surrounded in the circumferential direction 8 by a perforated tubular casing 26. The inflow passage 2 is formed by a perforated inner tube 25.

A direction of flow 32 of the gas stream is indicated by solid black arrows in this case. Accordingly, the gas stream flows through the inner tube 25, which forms an inflow passage and is perforated in the region of the honeycomb body 1, into the interior of the sheet-metal layers 4, where it flows through the passages 6 and emerges again in the radial direction 10 through the perforations in the tubular casing 26. If the gas stream enters the honeycomb body 1 through the perforated tubular casing 26, the direction of flow 32 is reversed.

Figure 2:
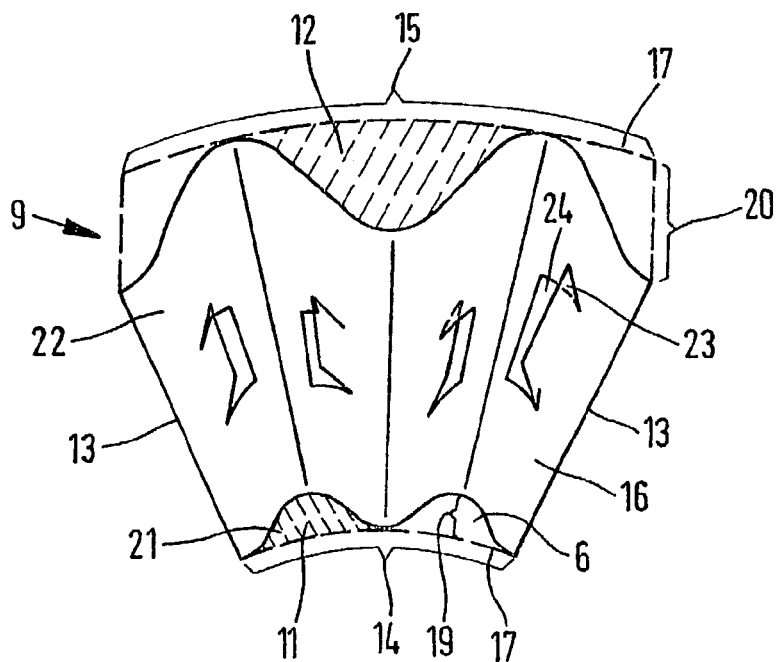
FIG. 2 is an enlarged, fragmentary, perspective view of an embodiment of a segment.

FIG. 2 shows a diagrammatic and perspective illustration of an embodiment of a segment 9 of the honeycomb body 1 according to the invention. The illustrated segment 9 can be produced, for example, from a smooth metal sheet by corrugation production processes using suitably conical corrugating rolls or deep-drawing. The segment 9 is in the form of a segment of a ring and is delimited by a first arc section 14 and a second arc section 15 and two sides or flanks 13. The arc sections 14 and 15 are preferably disposed concentrically with respect to one another. The illustrated segment 9 is disposed in the honeycomb body 1 in such a way that the passages 6 run in the radial direction 10 and the passages 6 have a flow cross section which increases in the radial direction 10. The illustrated segment 9, as well as the smooth metal sheets 17 indicated by dashed lines, delimit a passage 6. In each case, the passage 6 has a first flow cross section 11 and a second flow cross section 12. The first flow cross section 11, with a first corrugation height 19, is constructed to be smaller than the second flow cross section 12, which is disposed on the radially outer side and has a second corrugation height 20. The segment 9 or the corrugated metal sheet 16 has a thickness 21 which is preferably less than 0.04 mm. Furthermore, the segment 9 is constructed with projections 23 and openings 24, which are responsible for swirling up the gas stream flowing through the passage 6. A catalytically active coating 22, which in particular has a zeolite structure and includes precious metal constituents, is disposed on the surface of the segment 9.

Figure 3:
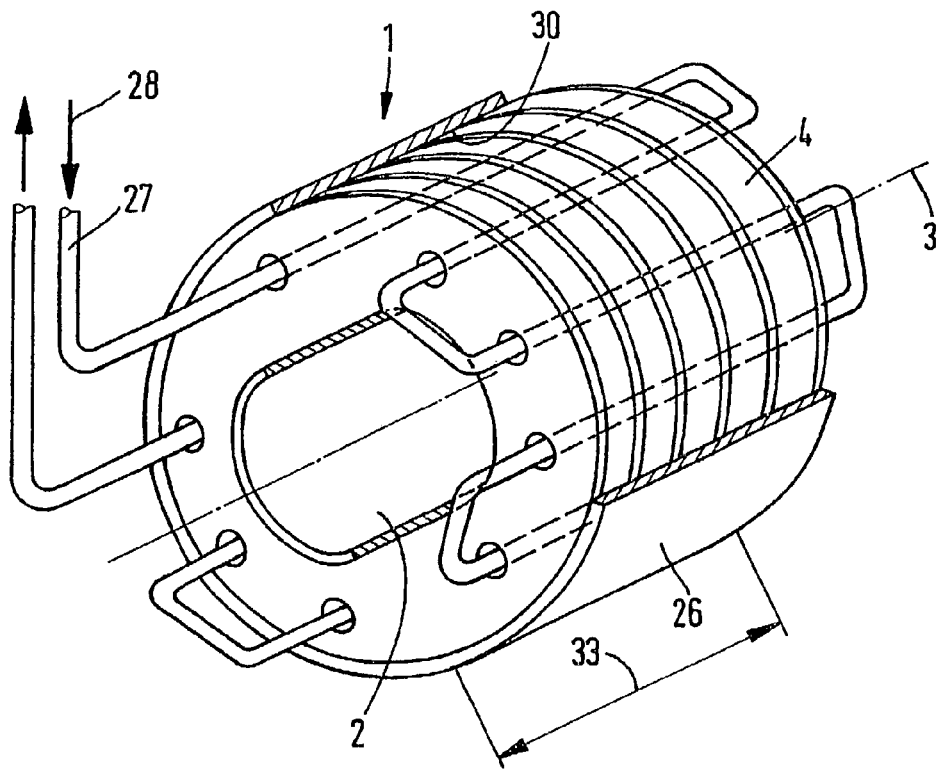
FIG. 3 is a fragmentary, perspective view of a further configuration of the honeycomb body according to the invention with a heating device.

FIG. 3 shows a diagrammatic and perspective illustration of a further configuration of a honeycomb body 1 according to the invention with a heating device or heater. The illustrated honeycomb body 1 is constructed with a system of tubes 27 which extend in the axial direction 3 and through which a heating medium 28 can flow. In this case, the system of tubes 27 extends over an entire axial length 33 of the honeycomb body 1. The system of tubes 27 which penetrates through the sheet-metal layers 4 is distributed uniformly over the circumference of the honeycomb body 1. If the heating medium 28, such as hot air or hot water, for example, is flowing through the system of tubes 27 in the manner indicated by black arrows, the system of tubes 27 functions as a heat exchanger. In this case, it is particularly advantageous to provide the tubular casing 26 with an insulation 30 (for example made from a ceramic material), so that heat which is introduced into the honeycomb body 1 is preserved. If a honeycomb body 1 is constructed in this way with a system of tubes 27, it is advantageous for the sheet-metal layers 4 of the honeycomb body 1 to be made only from corrugated metal sheets. This ensures intensive contact between the gas stream and the hot system of tubes 27, since communicating passages or channels 6 are formed.

Figure 4:
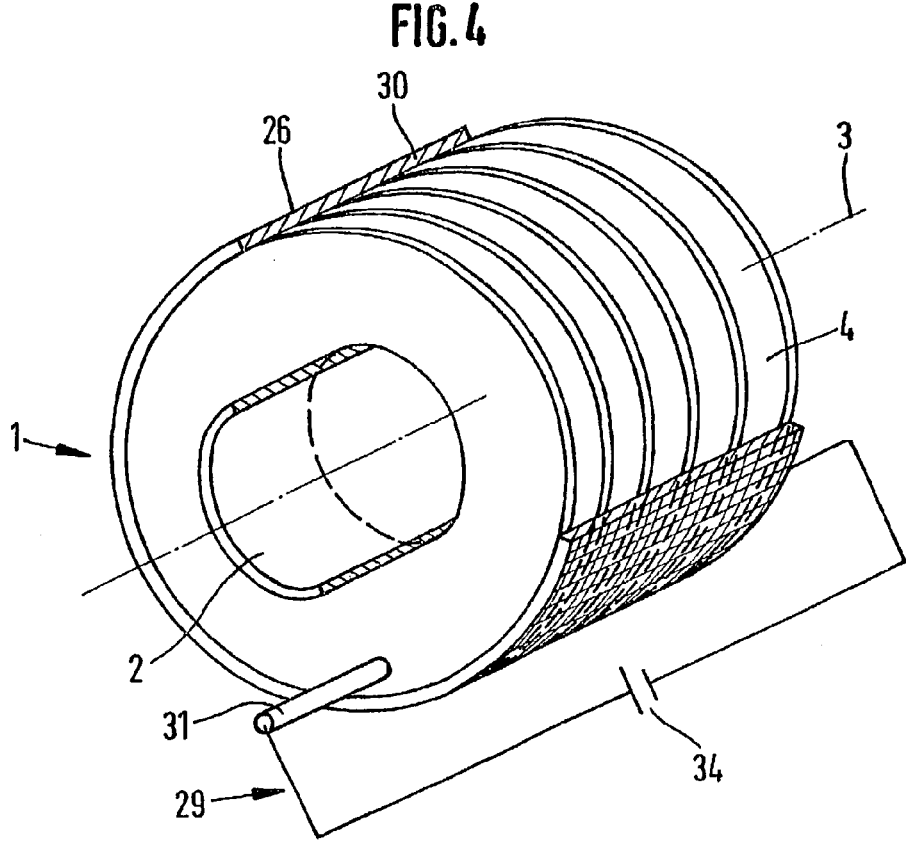
FIG. 4 is a fragmentary, perspective view of an added configuration of the honeycomb body according to the invention with a heating device.

FIG. 4 shows a further configuration of a honeycomb body 1 according to the invention with an electric heater 29. The sheet-metal layers 4 are disposed around the inflow passage 2 having the axis 3 and are surrounded by a tubular casing 26.

The honeycomb body 1 also has at least one connection 31 which is connected to a voltage source 34. The connection 31 may, for example, be connected to one or more non-illustrated segments 9 or a non-illustrated electrically insulated wire disposed in the sheet-metal layers 4. Heat which is responsible for heating the honeycomb body 1 is generated as a result of the application of a voltage in combination with the resistance of the segment 9 or the wire. In FIG. 4, the tubular casing 26 is constructed as a mesh-shaped or screen-shaped structure which is formed from an insulating material 30. The thermal and electrical insulation 30 may also be constructed as a coating on a carrier substance.

The honeycomb body according to the invention, for the chemical conversion of at least one component of a gas stream having sheet-metal layers which are each disposed in one plane, and in which the sheet-metal layers are segmented in the circumferential direction, can be produced particularly easily and at particularly low cost. Moreover, the segments allow the honeycomb body according to the invention to have a very flexible and variable construction.

We claim:

1. A honeycomb body for the chemical conversion of at least one component of a gas stream, comprising:
    an inflow passage having an axis; and
    sheet-metal layers, at least some of said sheet-metal layers being structured to form two sets of crests and passages through which the gas stream can flow, each of said sets of crests of each of said sheet-metal layers defining a respective plane;
    said sheet-metal layers being segmented in the circumferential direction of the honeycomb body define segments of a ring, each of said segments being delimited by first and second arc sections and two sides, said sides of said segments being disposed adjacent one another to form said ring; and
    said axis and said plane including an angle of between 45° and 135°.

2. The honeycomb body according to claim 1, wherein said angle included by said axis and said plane is between 70° and 110°.

3. The honeycomb body according to claim 1, wherein said passages extend substantially in radial direction of the honeycomb body.

4. The honeycomb body according to claim 1, wherein said passages have a flow cross section increasing in radial direction of the honeycomb body.

5. The honeycomb body according to claim 1, wherein said sides extend substantially in radial direction of the honeycomb body and said first arc section is smaller than said second arc section.

6. The honeycomb body according to claim 1, wherein said sheet-metal layers include alternating corrugated metal sheets and smooth metal sheets forming a plurality of layers in axial direction of the honeycomb body.

7. The honeycomb body according to claim 6, wherein said metal sheets have a thickness of less than 0.08 mm.

8. The honeycomb body according to claim 6, wherein said metal sheets have a thickness of less than 0.04 mm.

9. The honeycomb body according to claim 6, wherein said metal sheets have a thickness of less than 0.02 mm.

10. The honeycomb body according to claim 1, wherein said sheet-metal layers have a catalytically active coating.

11. The honeycomb body according to claim 1, wherein said sheet-metal layers have at least one of openings and projections extended into said passages.

12. The honeycomb body according to claim 1, wherein said inflow passage is at least partly formed with a perforated inner tube.

13. The honeycomb body according to claim 1, wherein said inflow passage is at least partly formed with a porous inner tube.

14. The honeycomb body according to claim 1, wherein said inflow passage is at least partly formed with a perforated and porous inner tube.

15. The honeycomb body according to claim 1, which further comprises a perforated tubular casing at least partly radially outwardly surrounding said sheet-metal layers.

16. The honeycomb body according to claim 1, which further comprises a porous tubular casing at least partly radially outwardly surrounding said sheet-metal layers.

17. The honeycomb body according to claim 1, which further comprises a perforated and porous tubular casing at least partly radially outwardly surrounding said sheet-metal layers.

18. The honeycomb body according to claim 1, which further comprises a heater extended at least partially through said sheet-metal layers.

19. The honeycomb body according to claim 18, wherein said heater is a tube system extended at least partially in axial direction of the honeycomb body for conducting a heating medium flow.

20. The honeycomb body according to claim 18, wherein said heater is an electric heater.

21. A honeycomb body for the chemical conversion of at least one component of an exhaust-gas stream from an internal combustion engine, the honeycomb body comprising:

an inflow passage having an axis; and sheet-metal layers, at least some of said sheet-metal layers being structured to form two sets of crests and passages through which the gas stream from the internal combustion engine can flow, each of said sets of crests of each of said sheet-metal layers defining a respective plane;

said sheet-metal layers being segmented in the circumferential direction of the honeycomb body define segments of a ring, each of said segments being delimited by first and second arc sections and two sides, said sides of said segments being disposed adjacent one another to form said ring; and said axis and said plane including an angle of between 45° and 135°.

22. The honeycomb body according to claim 21, wherein said angle included by said axis and said plane is between 70° and 110°.

\* \* \* \* \*